(12) United States Patent
Li et al.

(10) Patent No.: US 7,722,137 B2
(45) Date of Patent: May 25, 2010

(54) COMPUTER BEZEL

(75) Inventors: Ding-Fang Li, Shenzhen (CN);
Hsuan-Tsung Chen, Tu-Cheng (TW);
Yang-Ming Lin, Shenzhen (CN);
Xiao-Zhong Jing, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1123 days.

(21) Appl. No.: 11/365,639

(22) Filed: Feb. 28, 2006

(65) Prior Publication Data
US 2006/0261711 A1 Nov. 23, 2006

(30) Foreign Application Priority Data
May 20, 2005 (CN) .................... 2005 2 0058740 U

(51) Int. Cl.
*A47B 81/00* (2006.01)
*A47B 97/00* (2006.01)
(52) U.S. Cl. ................................. 312/223.2; 361/679.6
(58) Field of Classification Search .............. 312/223.2, 312/223.1, 306, 213, 312, 350; 49/501, 336; 70/90, 81, 97, 78; 292/175, 163; 361/683, 361/724, 727; 220/346, 347, 351, 326, 210, 220/254
See application file for complete search history.

(56) References Cited

U.S. PATENT DOCUMENTS

| | | | | |
|---|---|---|---|---|
| 5,169,218 A | * | 12/1992 | Chu | 312/223.2 |
| 5,820,235 A | * | 10/1998 | Tsai | 312/223.2 |
| 5,924,780 A | * | 7/1999 | Ammon et al. | 312/223.2 |
| 6,132,019 A | * | 10/2000 | Kim et al. | 312/223.2 |
| 6,452,788 B1 | * | 9/2002 | Crowley | 361/679.37 |
| 2004/0240166 A1 | * | 12/2004 | Kuo | 361/683 |
| 2005/0276022 A1 | * | 12/2005 | Xu | 361/724 |
| 2006/0268501 A1 | * | 11/2006 | Marroquin et al. | 361/683 |

FOREIGN PATENT DOCUMENTS

| | | |
|---|---|---|
| CN | 2558001 | 6/2003 |
| TW | 577567 | 2/2004 |

* cited by examiner

*Primary Examiner*—Janet M Wilkens
*Assistant Examiner*—Timothy M Ayres
(74) *Attorney, Agent, or Firm*—Zhigang Ma

(57) ABSTRACT

A computer bezel includes a main body (10), and a cover (30) movably attached to the main body. The cover includes a pair of slideways (31) formed thereon, and a hook (33) defining a slot (335) therein. The main body includes a plurality of shafts (19) extending from sidewalls (12) thereof to engage in the slideways, a channel (151) defined in the main body to slidably receive the hook therein, and a pair of locating members (153) formed in two ends of the channel to selectively engage in the slot of the hooks.

19 Claims, 4 Drawing Sheets

COMPUTER BEZEL

BACKGROUND OF THE INVENTION

1. Field of the Invention

The present invention relates to computer bezels, and particularly to a computer bezel with a cover which is slidably attached to a main body of the computer bezel and convenient to be opened and closed.

2. General Background

A computer often includes some drivers such as, for example, floppy disc drivers, optical disc drivers, and hard disc drivers. These drivers are mounted in a computer chassis. A computer bezel attached to the computer chassis and has corresponding openings for loading in/out the floppy discs, optical discs and hard discs. For protecting components in the computer chassis, some covers are often mounted on the computer bezel to cover the openings.

Some typically computer bezel with such covers is found. In such examples, covers are pivotally attached to the computer bezel. When in using, the cover is secondly opened. In such an arrangement, the cover extends towards the outside of the computer bezel after being opened, and then the cover is easily to be damaged by accident.

What is needed, therefore, is a computer bezel with a cover which covers an opening of the computer bezel exactly, and is convenient to be opened and closed.

SUMMARY

In a preferred embodiment, a computer bezel includes a main body, and a cover slidably attached to the main body. The cover includes a pair of slideways formed thereon, and a hook defining a slot therein. The main body includes a plurality of shafts extending from sidewalls thereof to engage in the slideways, a channel defined in the main body to slidably receive the hook therein, and a pair of locating members formed in two ends of the channel to selectively engage in the slot of the hook.

Other objects, advantages and novel features of the present invention will become more apparent from the following detailed description of preferred embodiments when taken in conjunction with the accompanying drawings, in which:

DETAILED DESCRIPTION OF THE PREFERRED EMBODIMENT

Figure 1:
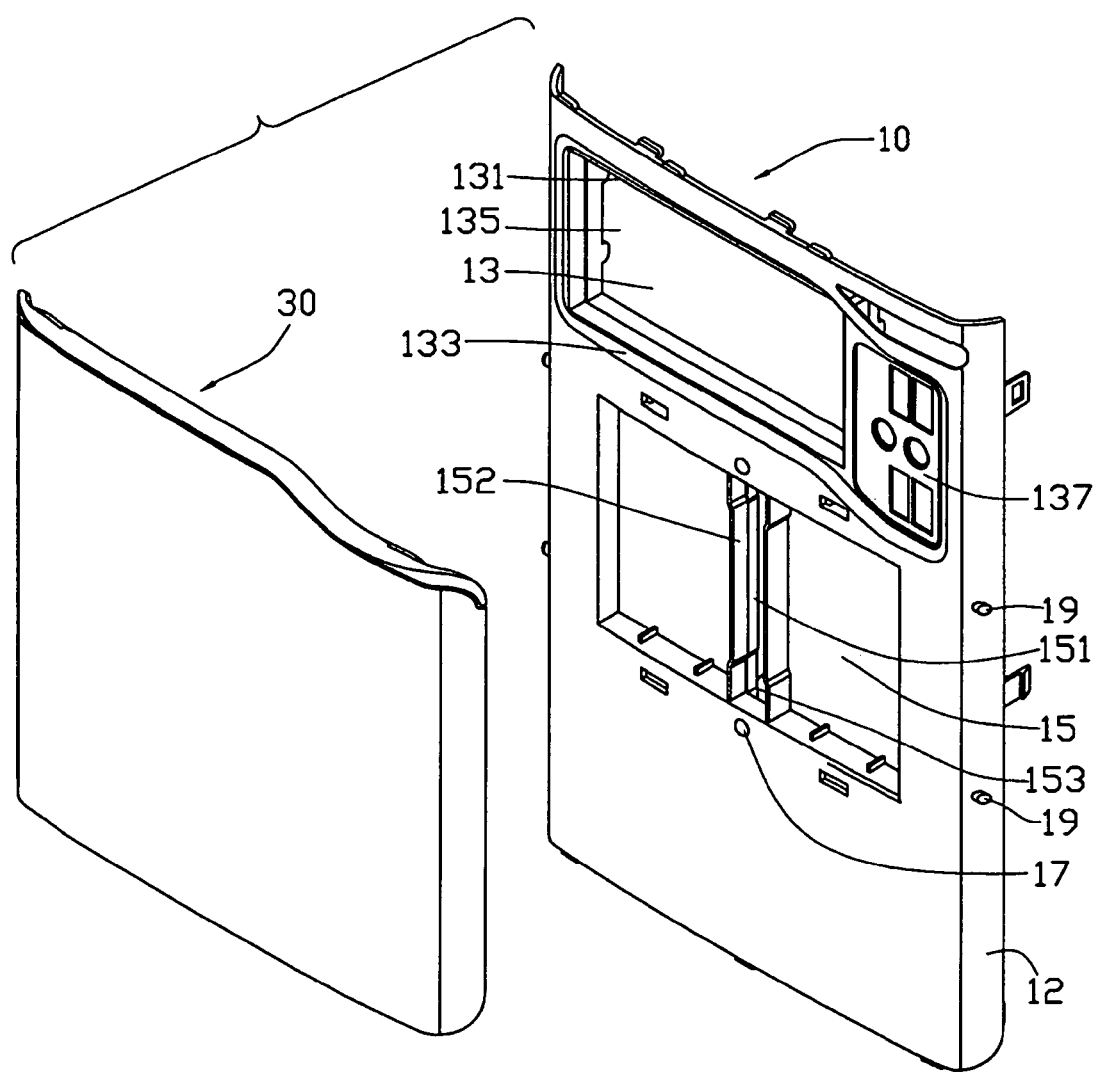
FIGS. 1 and 2 are exploded, isometric views of a computer bezel in accordance with a preferred embodiment of the present invention, but viewed in different views.
Figure 2:
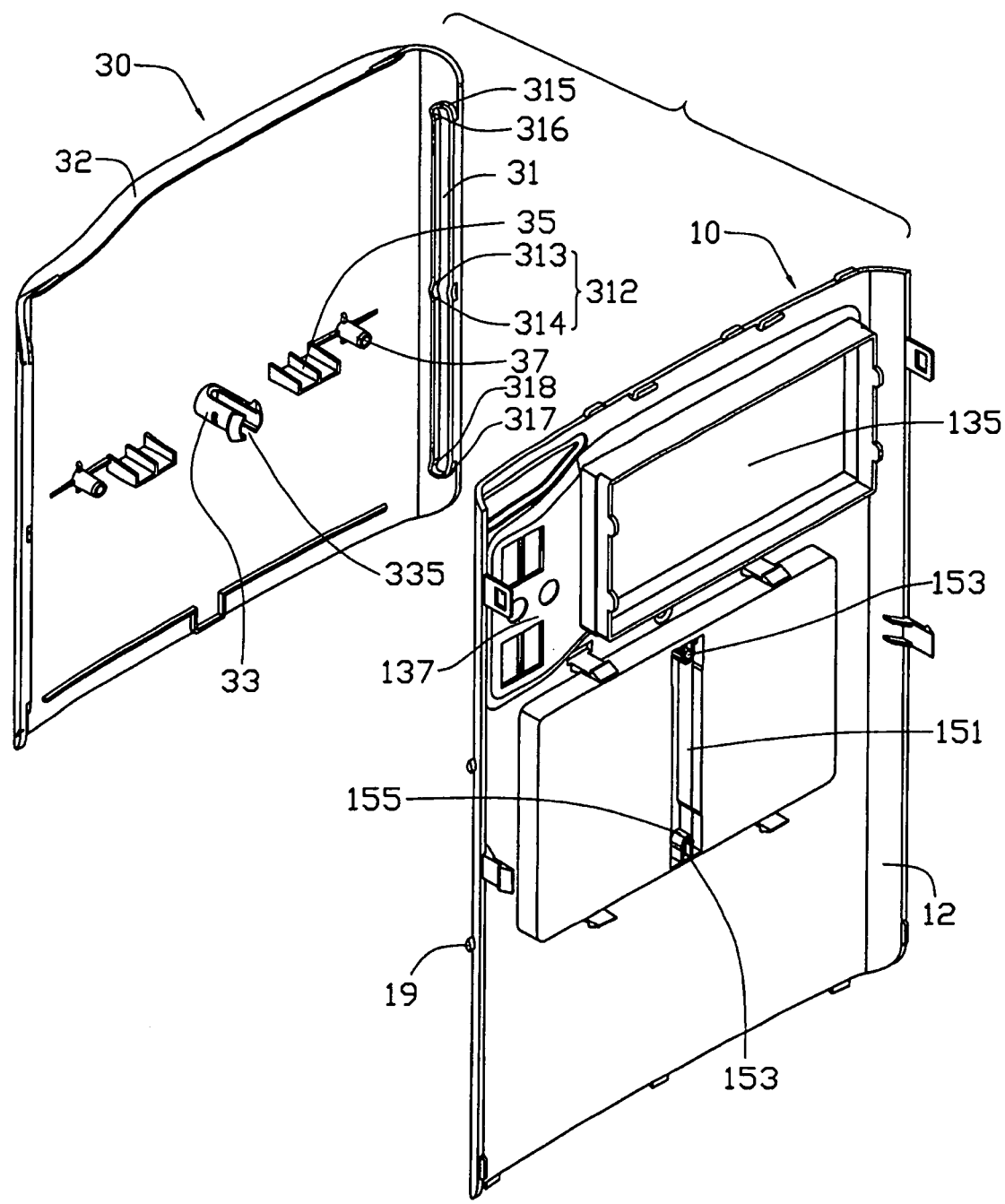

Refer to FIGS. 1 and 2, a bezel of an electronic device like a computer in accordance with a preferred embodiment of the present invention includes a main body 10, and a cover 30 slidably attached to the main body 10. The bezel is installable in front of an enclosure of the computer.

The main body 10 is often rectangular, and mounted on a front surface of a computer chassis (not shown). The main body 10 has a curved profile and includes a mounting region 13 defined in an upper portion thereof, and a recess 15 defined below the mounting region 13. A first side plate 131 is formed at an upper side of the recess 13. A second side plate 133 is formed at a lower side of the mounting region 13. An opening 135 is defined in the mounting region 13, for mounting internal devices of the computer, for example, read/write devices such as storage drivers (not shown) and I/O interface components (not shown). An I/O port area 137 is formed in the mounting region 13 besides the opening 135. A channel 151 is vertically defined in a middle portion of the recess 15. A pair of tabs 152 extends perpendicularly at two sides of the channel 151. A pair of locating members 153 is separately formed at an upper and a lower ends of the channel 15. Each of the locating members 153 forms a guiding portion 155 in a free end thereof. A pair of domed protrusions 17 extends besides two horizontal sides of the recess 15. Two pairs of spaced shafts 19 separately extend from two opposite sidewalls 12 of the main body 10.

The cover 30 generally has a curved configuration corresponding to the main body 10. The cover 30 includes a brim 33 extending from a top edge thereof, having a curved configuration, corresponding to the first and second side plates 131, 133 of the main body 10. A pair of parallel slideways 31 is formed from inner surfaces of the sides of the cover 30, corresponding to the shafts 19 of the main body 10. Each of the slideways 31 includes a turning portion 312 formed in a middle portion thereof, a first end portion 315, and a second end portion 317. Each of the turning portions 312 includes a pair of first slanting walls 313, and a pair of second slanting walls 314 angularly joining with the first slanting walls 313. The first end portion 315 includes a pair of first sloping wall 316 parallel to the second slanting walls 314. The second end portion 371 includes a pair of second slanting walls 318 parallel to the first slanting walls 313 of the turning portions 312. The cover 30 includes a hook 33 extending from a middle portion of the inner surface thereof, a pair of blocks 35 extending beside the hook 33, and a pair of posts 37 extending beside the blocks 35. The hook 33 includes a slot 332 defined therein.

Figure 3:
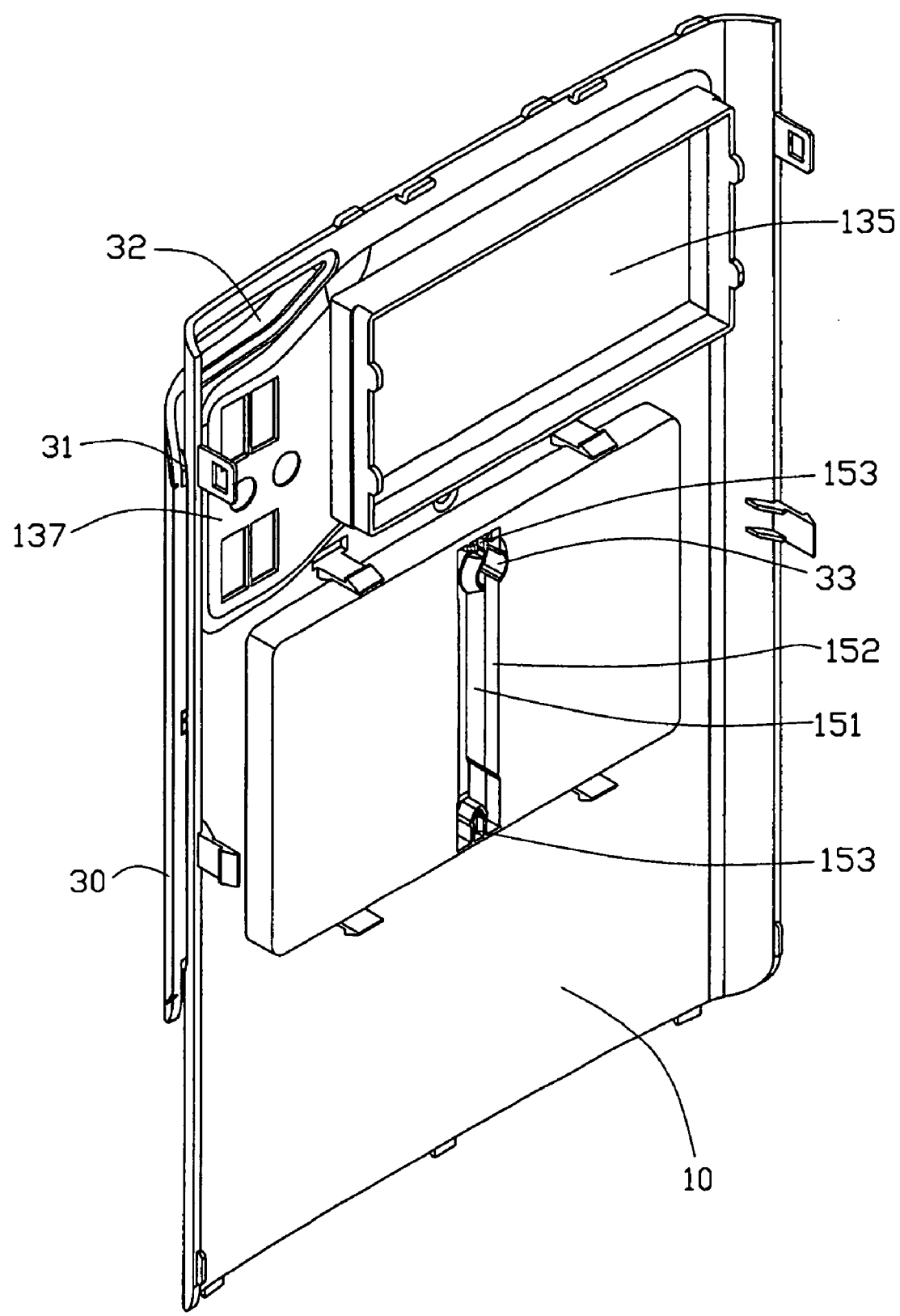
FIGS. 3 and 4 are assembled views of FIG. 2, but separately showing in an open and a closed states.
Figure 4:
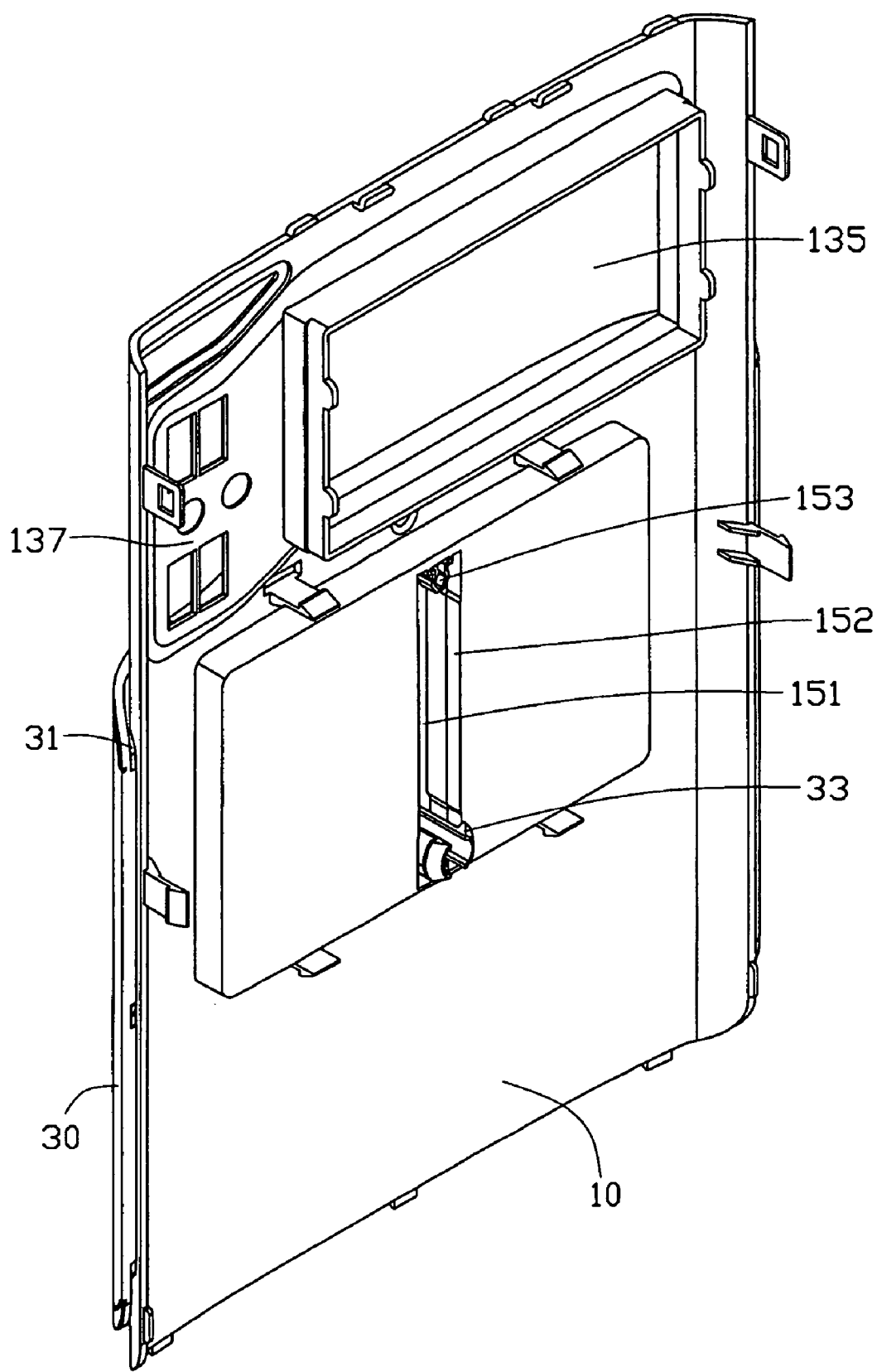

Refer to FIGS. 3 and 4, in assembly, the cover 30 is slidably attached to the main body 10. The hook 33 is squeezed and extended through the channel 151 and engages with the main body 10. The shafts 19 of the main body 10 are engaged in the corresponding slideways 31 of the cover 30. The first and second slanting walls 313, 314 of the turning portions 312, and the first and second slanting slopes 316, 318 of the first and second end portions 315, 317 slantingly extend away from respective slideways 31, therefore the cover 30 is capable of being slightly moved away from the main body 10 when the shafts 19 of the main body 10 ride along the slanting slopes 316, 318 and the slanting walls 313, 314 to disengage from the first or second end portions 315, 317 and the turning portions 312. Thus, the sliding resistance of the shafts 19 sliding in the slideways 31 besides the end portions 315, 317 and the turning portion 313 is lessened, because of the increased distance between the cover 30 and the main body 10. The blocks 35 and the posts 37 are received in the recess 15 and distal ends thereof slidably engage with the recess 15. The protrusions 17 engage with the inner surface of the cover 30. The cover 30 can move between an open position and a closed position relative to the main body 10.

To expose the mounting region 13, the cover 30 is pushed downwardly. The shafts 19 separately slide along the first sloping walls 316 of the first end portions 315 and the second slanting walls 314 of the turning portion 312 to move away from the turning portions 312 and the first end portions 315. The shafts 19 slide along the slideways 31 downwardly until the mounting region 13 is entirely exposed. At the same time, a lower locating member 153 of the main body 10 is extended into the slot 335 of hook 33 of the cover 30 via the guiding portion 155 thereof to locate the cover 30 in the open position.

The shafts 19 separately locate in the second end portions 317 and the turning portions 312. The brim 32 of the cover 30 aligns with the second side plate 133 of the main body 10.

To shield the mounting region 13, the cover 30 is pushed upwardly. The shafts 19 separately slide along the second sloping walls 318 of the second end portions 317 and the first slanting walls 313 of the turning portions 312 to move away from the second end portions 317 and the turning portions 312. The shafts 19 slide along the slideways 31 upwardly until the mounting region 13 is entirely covered. At the same time, an upper locating member 153 of the main body 10 extends into the slot 335 of hook 33 of the cover 30 via the guiding portion 155 thereof to retain the cover 30 in the closed position. The shafts 19 separately locate in the first end portions 315 and the turning portions 312. The brim 32 of the cover 30 aligns with the first side plate 131 of the main body 10.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A computer bezel comprising:
    a main body comprising an opening, a plurality of shafts extending from sidewalls of the main body, a channel defined in the main body, a pair of spaced locating members formed in the channel; and
    a cover slidably attached to the main body to cover the opening, a pair of slideways formed from the cover to slidably receive the shafts of the main body therein, a hook extending from the cover to be slidably received in the channel of the main body and selectively engaging with the locating members to retain the cover at a first position to cover the opening of the main body, and a second position to reveal the opening of the main body, respectively.

2. The computer bezel as claimed in claim 1, wherein the hook defines a slot therein, the locating members selectively engage in the slot.

3. The computer bezel as claimed in claim 2, wherein each of the locating members comprises a guiding portion extending from a free end thereof.

4. The computer bezel as claimed in claim 1, wherein the main body comprises a recessed mounting region, and a recess below the mounting region, the opening is defined in the mounting region, the channel is vertically defined in a middle portion of the recess.

5. The computer bezel as claimed in claim 4, wherein the locating members are separately formed at two opposite ends of the channel.

6. The computer bezel as claimed in claim 4, wherein a plurality of blocks extends from an inner surface of the cover, received in and slidably engaging with the recess.

7. The computer bezel as claimed in claim 4, wherein a pair of protrusions extends from the main body besides the recess, engaging an inner surface of the cover.

8. The computer bezel as claimed in claim 1, wherein each of the slideways comprises a first end portion, a second end portion, and a turning portion disposed in a middle portion thereof.

9. The computer bezel as claimed in claim 8, wherein each of the turning portions comprises a pair of first slanting walls, and a pair of second slanting walls angular to the first slanting walls.

10. The computer bezel as claimed in claim 9, wherein each of the first end portions comprises a pair of first sloping walls parallel to the second slanting walls of the turning portions.

11. The computer bezel as claimed in claim 9, wherein each of the second end portions comprises a pair of second sloping walls parallel to the first slanting walls of the turning portions.

12. A computer bezel comprising:
    a main body comprising an opening;
    a cover slidably attached to the main body to cover the opening;
    a sliding mechanism disposed between the main body and the cover, the sliding mechanism comprising a pair of slideways, and at least one pair of shafts sliding in the slideways, wherein each of the slideways comprises at least one end portion, the end portion comprises a pair of slanting slopes, the cover is moved away from the main body when the shafts slide along the slanting slopes to disengage from the end portions of the respective slideways; and
    a locating mechanism disposed between the cover and main body, the locating mechanism comprising a hook, and a pair of spaced locating members, the hook movably engaging with the locating members to locate the cover in an open position and a closed position.

13. The computer bezel as claimed in claim 12, wherein the slideways are formed from an inner surface of the cover, said shafts extend from sidewalls of the main body.

14. The computer bezel as claimed in claim 12, further comprising a channel defined in the main body, the hook slides in the channel, and the locating members are formed at two ends of the channel.

15. The computer bezel as claimed in claim 12, wherein the hook defines a slot therein to engage the locating members therein.

16. An electronic device comprising:
    an enclosure of said electronic device;
    a bezel attachably installable to a side of said enclosure, said bezel defining an opening as an access into said enclosure;
    a cover removably attachable to said bezel, and movable relative to said bezel along a direction parallel to said side of said enclosure between a first position thereof to cover said opening and a second position thereof to reveal said opening;
    a sliding mechanism defined between said bezel and said cover, and comprising at least one channel defined in a selective one of said bezel and said cover so as to guide movement of said cover based on said at least one channel; and
    a locating mechanism defined in said at least one channel, and comprising a hook and a pair of spaced locating members correspondingly defined in said at least one channel to engage with the hook, so as to retain said cover at said first and second positions thereof respectively when said cover moves thereto.

17. The electronic device as claimed in claim 16, wherein said at least one channel is formed in a middle position of a recess defined in said bezel.

18. The electronic device as claimed in claim 16, wherein the hook extends from the cover, and the locating members are formed at two ends of the channel.

19. The electronic device as claimed in claim 16, wherein the hook defines a slot therein to engage the locating members therein.

* * * * *